United States Patent
Caruso et al.

(10) Patent No.: US 12,555,466 B2
(45) Date of Patent: Feb. 17, 2026

(54) REMOTE CONTROLLED METER FOR DEPICTING A DESIRED OUTCOME AND METHODS OF MAKING AND USING SAME

(71) Applicants: Brandon F. Caruso, Luzerne, PA (US); Shane F. Loveland, Luzerne, PA (US)

(72) Inventors: Brandon F. Caruso, Luzerne, PA (US); Shane F. Loveland, Luzerne, PA (US)

( * ) Notice: Subject to any disclaimer, the term of this patent is extended or adjusted under 35 U.S.C. 154(b) by 98 days.

(21) Appl. No.: 18/676,637

(22) Filed: May 29, 2024

(65) Prior Publication Data

US 2024/0412623 A1 Dec. 12, 2024

Related U.S. Application Data

(60) Provisional application No. 63/506,847, filed on Jun. 8, 2023.

(51) Int. Cl.
 *G08C 17/02* (2006.01)
(52) U.S. Cl.
 CPC .................... *G08C 17/02* (2013.01)
(58) Field of Classification Search
 CPC ....................................... G08C 17/02
 USPC ........................................... 340/4.3
 See application file for complete search history.

(56) References Cited

U.S. PATENT DOCUMENTS

| | | | | |
|---|---|---|---|---|
| 4,761,633 A * | 8/1988 | Leff | ............... | G09B 19/12 340/286.07 |
| 7,785,541 B1 * | 8/2010 | Fiorello | ............ | B05B 12/00 422/123 |
| 7,871,013 B2 * | 1/2011 | Schumann | .......... | G07F 7/0833 235/487 |
| 10,188,936 B2 * | 1/2019 | Back | .................. | A63F 9/24 |
| 11,241,631 B1 * | 2/2022 | Buller | ............... | A63F 13/24 |
| 12,451,725 B2 * | 10/2025 | Shearer | ............ | G06K 19/0707 |
| 2003/0227406 A1 * | 12/2003 | Armstrong | ....... | H01H 9/0235 341/176 |

(Continued)

OTHER PUBLICATIONS

"Interactive Santa Meter, Naughty or Nice Christmas Ornament with Real Working Gears | Personalized Gift for 2023" https://www.amazon.com/Interactive-Naughty-Christmas-Ornament-Personalized/dp/BOB5MR4WN4/ref=sr_1_1?adgrpid=1346902308008879&dib=eyJ2ljoiMSJ9.0aprRZT1XlqXqmsZPkv-OVrPoD5YTUx4p.

(Continued)

*Primary Examiner* — Omar Casillashernandez
(74) *Attorney, Agent, or Firm* — James R. McDaniel; Lawrence P. Zale; Zale Patent Law, Inc.

(57) ABSTRACT

Systems, methods, and other embodiments for a remote-controlled meter for depicting a desire outcome, including a frame, a front cover removably connected to a side of the frame, a movable pointer located between the front cover and the side of the frame, a plurality of graphics located along a portion of the front cover, a processor located on another side of the frame, a power source assembly located on the another side of the frame, wherein the power source assembly is connected to the processor, a gear motor located on the another side of the frame, wherein the gear motor is connected to the movable pointer, processor, and power source assembly, a transceiver located on the another side of the frame, wherein the transceiver is connected to the processor and power source assembly, and a remote-control device, wherein the transceiver is configured to interact with the remote-control device.

17 Claims, 2 Drawing Sheets

(56) References Cited

U.S. PATENT DOCUMENTS

| | | | | |
|---|---|---|---|---|
| 2004/0115605 | A1* | 6/2004 | Cooper | G09B 23/28 |
| | | | | 600/300 |
| 2006/0016115 | A1* | 1/2006 | Ware | A01M 31/06 |
| | | | | 43/26.1 |
| 2006/0256196 | A1* | 11/2006 | Stoner | H04N 21/42204 |
| | | | | 348/E5.103 |
| 2007/0139246 | A1* | 6/2007 | Chen | G08C 17/00 |
| | | | | 341/176 |
| 2008/0042873 | A1* | 2/2008 | Harvey | G01D 4/006 |
| | | | | 340/870.03 |
| 2008/0084790 | A1* | 4/2008 | McKee | G04G 9/00 |
| | | | | 368/10 |
| 2011/0217897 | A1* | 9/2011 | Sackley | G01P 1/08 |
| | | | | 446/26 |
| 2017/0336785 | A1* | 11/2017 | Young | B60T 1/16 |

OTHER PUBLICATIONS

Mr. Christmas Indoor Santa Meter https://www.amazon.com/Mr-Christmas-Indoor-Santa-Meter/dp/B086WRDCMJ/ref=as_li_ss_tl?dchild=1&keywords=Mr.%2BChristmas%2Bindoor%2Bsanta%2Bmeter&qid=1606338941&sr=8-2&linkCode=.

Twelve Timbers Naughty or Nice Meter https://twelvetimbers.com/collections/santa-meters.

* cited by examiner

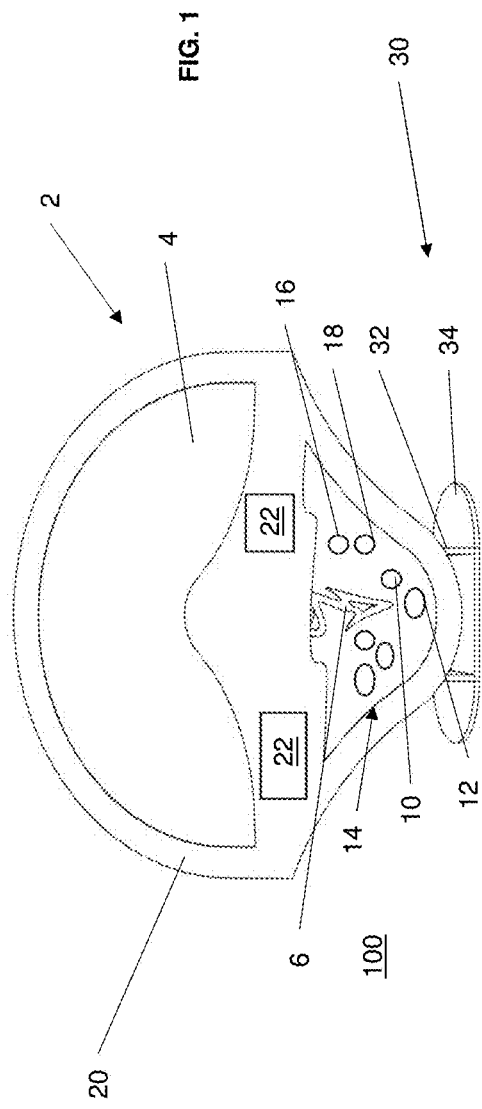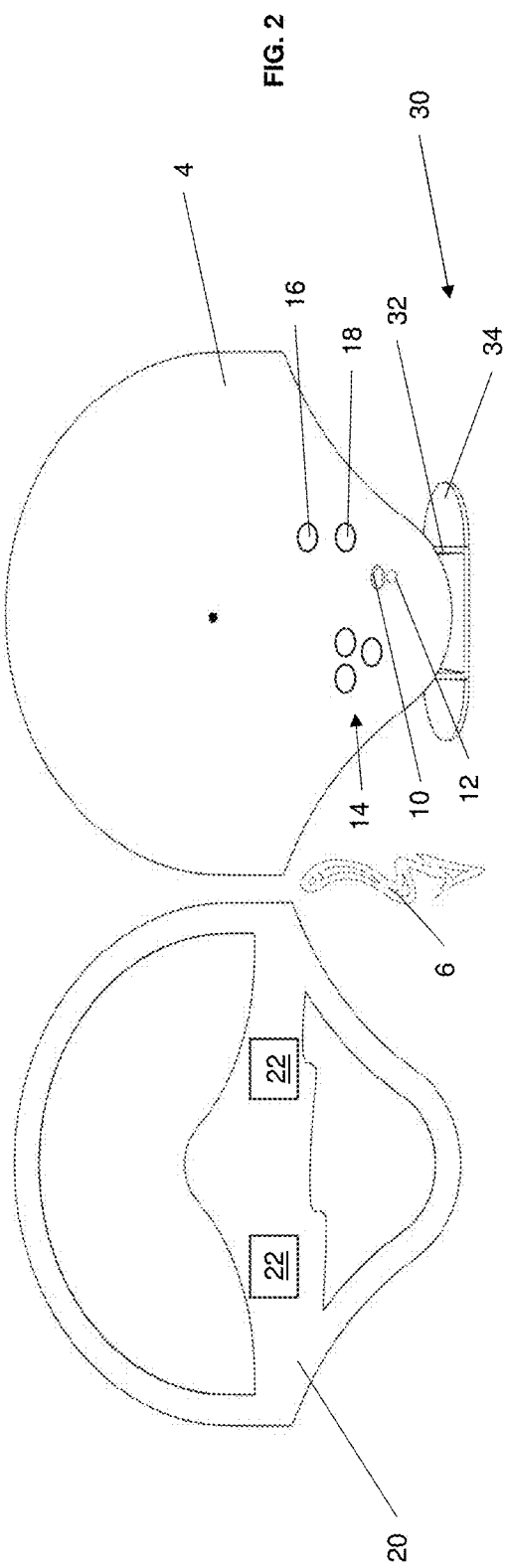

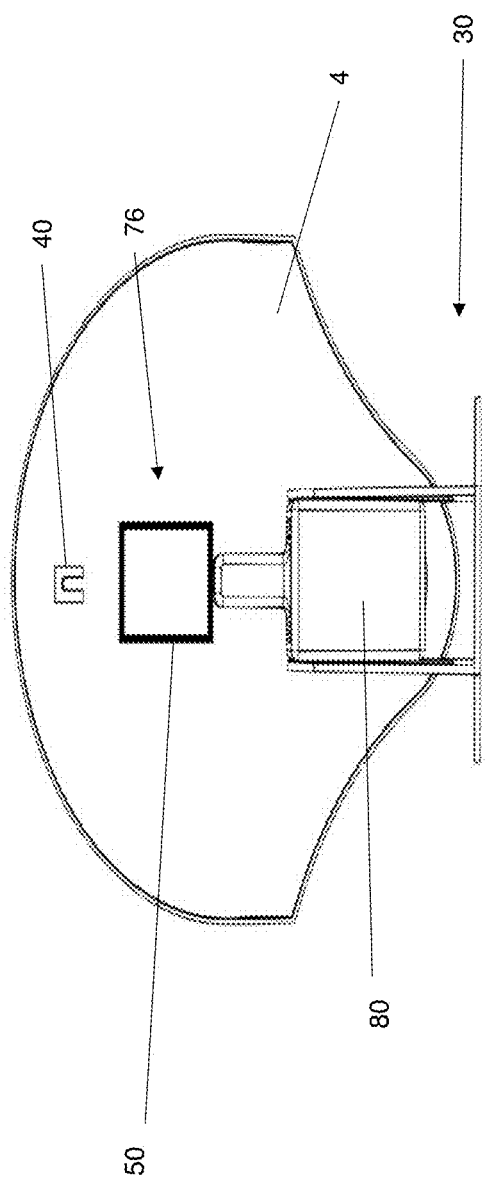
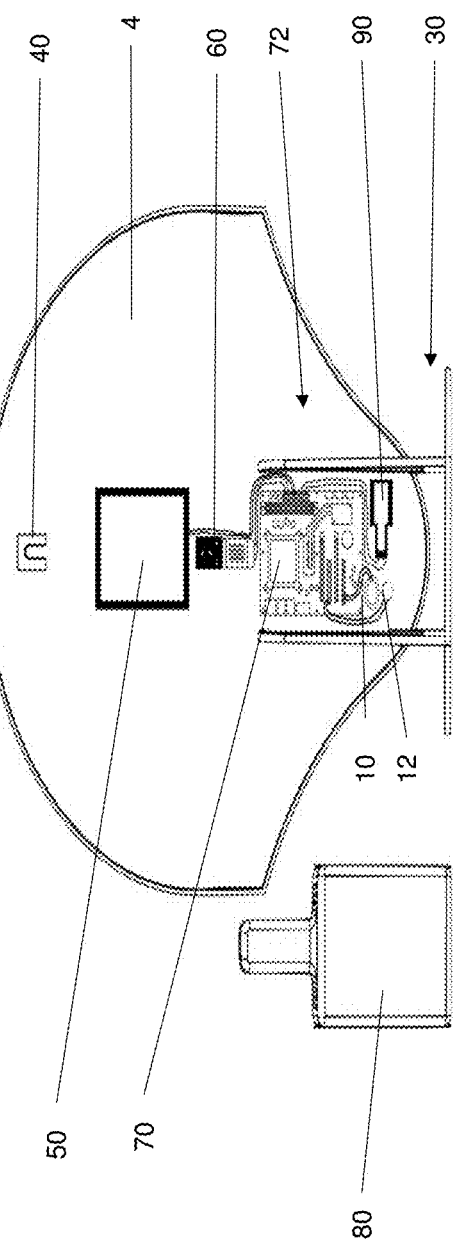

REMOTE CONTROLLED METER FOR DEPICTING A DESIRED OUTCOME AND METHODS OF MAKING AND USING SAME

CROSS-REFERENCE TO RELATED APPLICATION

This application claims benefit of U.S. Patent Application 63/506,847, filed on Jun. 8, 2023, the disclosure of which is hereby incorporated by reference in its entirety to provide continuity of disclosure to the extent such a disclosure is not inconsistent with the disclosure herein.

FIELD OF THE INVENTION

The present invention relates to a remote-controlled meter for depicting a desired outcome. In particular, the remote-controlled meter is designed with the ability to point to a specific area chosen by the operator. The remote-controlled meter includes a remote and/or is controlled with an app that sends a signal to a Bluetooth® transmitter which sends power to two (2) channel receiver microchips which control a low voltage, low revolutions per minute (rpm) motor. The motor controls a pointer/needle which allows the user to stop the pointer/needle at a specific area on graphics located on the meter. The remote-controlled meter can be powered by batteries (including rechargeable batteries) and/or an adaptor plug. Additional features of the remote-controlled meter may include a camera that will allow the operator to view the audience, light emitting diode (LED) lights, and a speaker that plays music and allows the operator to communicate with the audience that is watching the remote-controlled meter. The camera, remote, and speaker are capable of being controlled with a self-contained software package that allows the user to perform specific tasks on a mobile or desktop device ("an app") and connected to a Bluetooth® transmitter designed for audio, video, and motor transmission.

BACKGROUND OF THE INVENTION

For a long time, parents have been trying to persuade children to be on their best behavior. Parents give out gifts during holiday seasons and weekly allowances to encourage and teach their kids that with good behavior and hard work, they will be rewarded. Children have been taught about being naughty or nice, especially during the holiday season. Books, movies, poems and other similar artistic creations have been made to impress upon children the benefits of being nice over being naughty.

Furthermore, various entertainment devices and games have been developed in order to also encourage children to be nice rather than naughty. Towards this end, it is known that there are devices available that can be used to indicate to a child if the child has been naughty or nice. In particular, naughty or nice meters are available that can be used to indicate to the child if the child has been naughty or nice.

While these current naughty or nice meters may have been commercially successful, these current naughty or nice meters do not provide the following:
1. The ability to interact with the child;
2. The ability to view the child as the child is looking at the meter;
3. The ability to communicate with the child as the child is looking at the meter;
4. The ability to remotely control the meter;
5. The ability to provide various lights and music on the meter;
6. The ability to provide Wi-Fi capabilities on the meter;
7. The ability to operate the meter through a mobile communication device such as a laptop computer, a smartphone, a tablet, or the like; and
8. The ability to sense when the child is in proximity with the meter.
9. The use of an app on the mobile communication device, wherein the app is configured to allow the user to control the meter.
10. The ability to provide a countdown date for a special occasion such as a birthday, anniversary, holiday, or the like.

The preferred remote-controlled meter, according to various embodiments of the present invention, offers the following advantages: ease of use; portability; reduced cost; reduced weight; the ability to interact with the child; the ability to view the child as the child is looking at the meter; the ability to communicate with the child as the child is looking at the meter; the ability to remotely control the meter; the ability to provide various lights and music on the meter; the ability to provide Bluetooth® capabilities on the meter; the ability to operate the meter through a mobile communication device such as a laptop computer, a smartphone, a tablet or the like, and the ability to sense when the child is in close proximity with the meter. In fact, in many of the preferred embodiments, these advantages are optimized to the extent that is considerably higher than previously achieved in prior known entertainment and play devices.

This invention's purpose is to fulfill these and other needs in entertainment and play art in a manner more apparent to the skilled artisan once given the following disclosure.

BRIEF DESCRIPTION OF THE DRAWINGS

Some embodiments of the present invention are illustrated as an example and are not limited by the figures of the accompanying drawings, in which like references may indicate similar elements and in which:

FIG. 1 is a schematic illustration of a front view of a remote-controlled meter for depicting a desired outcome, according to various embodiments of the present invention described herein.

FIG. 2 is a schematic illustration of the front view of the remote-controlled meter for depicting a desired outcome, with the front cover removed, according to various embodiments of the present invention described herein.

FIG. 3 is a schematic illustration of the front cover, according to various embodiments of the present invention described herein.

FIG. 4 is a schematic illustration of a rear view of the remote-controlled meter for depicting a desired outcome, wherein the audio/video capable transceiver is connected to a speaker and camera and the transceiver is connected to a low voltage/low rpm motor which controls the outcome, according to various embodiments of the present invention described herein.

FIG. 5 is another schematic illustration of a rear view of the remote-controlled meter for depicting a desired outcome with the motor/processor cover being removed, according to various embodiments of the present invention described herein.

DETAILED DESCRIPTION OF THE INVENTION

The terminology used herein is to describe particular embodiments only and is not intended to be limiting to the invention. As used herein, the term "and/or" includes any and all combinations of one or more of the associated listed items. As used herein, singular forms "a", "an", and "the" are intended to include the plural forms as well as the singular forms unless the context clearly indicates otherwise. It will be further understood that the terms "comprises" and/or "comprising," when used in this specification, specify the presence of stated features, steps, operations, elements, and/or components but do not preclude the presence or addition of one or more other features, steps, operations, elements, components, and/or groups thereof.

Unless otherwise defined, all terms (including technical and scientific terms) used herein have the same meaning as commonly understood by one having ordinary skill in the art to which this invention belongs. It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein.

In describing the invention, it will be understood that a number of techniques and steps are disclosed. Each of these has individual benefits, and each can also be used in conjunction with one or more, or in some cases all, of the other disclosed techniques. Accordingly, for the sake of clarity, this description will refrain from repeating every possible combination of the individual steps in an unnecessary fashion. Nevertheless, the specification and claims should be read with the understanding that such combinations are entirely within the scope of the invention and the claims.

A new remote-controlled meter for depicting a desired outcome technology, device, apparatus, and methods for making and using are discussed herein. In the following description, for purposes of explanation, numerous specific details are set forth to provide a thorough understanding of the present invention. It will be evident, however, to one skilled in the art that the present invention may be practiced without these specific details.

The present disclosure is considered an exemplification of the invention and is not intended to limit the invention to the specific embodiments illustrated by the figures or description below.

The present invention will now be described by referencing the appended figures representing preferred embodiments. FIGS. 1-5 are illustrations of a remote-controlled meter for depicting a desired outcome.

In particular, as shown in FIGS. 1-3, there is illustrated a remote-controlled meter 2 for depicting a desired outcome. In particular, remote-controlled meter 2 also includes remote control device 100. In one embodiment, as shown in FIGS. 1 and 2, remote-controlled meter 2 includes, in part, frame 4, pointer or needle 6, speaker 10, camera 12, lights 14, microphone 16, proximity sensor 18, removable front cover 20, and removable stand assembly 30.

With respect to frame 4, in one embodiment, frame 4 is constructed of any suitable, durable, UV resistant, stain resistant material such as wood, metal or plastic.

With respect to pointer or needle 6, in one embodiment, pointer or needle 6 is constructed of any suitable, durable, UV resistant, stain resistant material such as wood, metal or plastic.

With respect to speaker 10, in one embodiment, speaker 10 is a conventional speaker that is attached to frame 4. As will be discussed in greater detail later, speaker 10 will allow sounds to be emitted from the remote-controlled meter 2. In another embodiment, speaker 10 is electrically connected to processor 70 (FIG. 5) and power source assembly 50.

With respect to camera 12, in one embodiment, camera 12 is a conventional camera that is attached to frame 4. As will be discussed in greater detail later, camera 12 will allow pictures and/or videos to be taken while remote-controlled meter 2 is being used. In another embodiment, camera 12 is electrically connected to processor 70 (FIG. 5) and power source assembly 50.

With respect to lights 14, in one embodiment, lights 14 are conventional lights LED that are attached to the frame 4. As will be discussed in greater detail later, lights 14 will allow the remote-controlled meter 2 to present a visual light display (if desired) while the remote-controlled meter 2 is being used. In another embodiment, lights 14 are electrically connected to processor 70 (FIG. 5) and power source assembly 50.

With respect to microphone 16, in one embodiment, microphone 16 is a conventional microphone that is attached to frame 4. As will be discussed in greater detail later, microphone 16 will allow the user to hear comments from a person facing the remote-controlled meter 2 while the remote-controlled meter 2 is being used. In another embodiment, microphone 16 is electrically connected to processor 70 (FIG. 5) and power source assembly 50.

With respect to proximity sensor 18, in one embodiment, proximity sensor 18 is a conventional proximity sensor that is attached to frame 4. As will be discussed in greater detail later, proximity sensor 18 will allow a distance between a person facing the remote-controlled meter 2 and the remote-controlled meter 2 to be determined while the remote-controlled meter 2 is being used. In another embodiment, proximity sensor 18 is electrically connected to processor 70 (FIG. 5) and power source assembly 50.

With respect to removable front cover 20, in one embodiment, removable front cover 20 can be conventionally attached to and removed from frame 4 by techniques such as fasteners or the like. It is to be understood that graphics 22 can be any suitable graphics located on the front of removable front cover 20 such that the graphics 22 are capable of providing the desired design for the remote-controlled meter 2. For example, the graphics 22 can be related to a holiday such as Christmas, Halloween, Hanukkah or the like or a special celebration such as a birthday, anniversary, bar mitzvah, quinceañera, or the like.

With respect to removable stand assembly 30, in one embodiment, removable stand assembly 30 includes, in part, legs 32 and base 34. Preferably, removable stand assembly 30 is constructed of any suitable, durable, UV resistant, stain resistant material such as wood, metal or plastic.

As shown in FIGS. 4 and 5, the back of the remote-controlled meter 2 is illustrated. In one embodiment, the remote-controlled meter 2 further includes, in part, hanging bracket 40, power source assembly 50, gear motor 60, processor 70, transceiver 72, motor/processor cover 80, and AC plug adapter port 90.

With respect to hanging bracket 40, in one embodiment, hanging bracket 40 is conventionally attached to the back to the frame 4 so that remote-controlled meter 2 can be conveniently attached to a wall or other solid surface (not shown).

With respect to power source assembly 50, in one embodiment, power source assembly 50 can be a battery pack (having non-rechargeable or rechargeable batteries 76) or the remote-controlled meter 2 can be electrically connected to an electrical outlet (not shown) through the use of a conventional power adapter and AC plug adapter port 90. If it is desired to connect the remote-controlled meter 2 to an electrical outlet, the power source assembly 50 can be conventionally converted to operate on AC power versus DC power.

With respect to gear motor 60, in one embodiment, gear motor 60 is attached to pointer or needle 6. Preferably, gear motor 60 should be constructed such that it is capable of adequately moving pointer or needle 6 in the desired direction. In one embodiment, the gear motor 60 should be a low voltage, low revolutions per minute (rpm) motor.

With respect to processor 70, in one embodiment, processor 70 should be configured to allow the user to interact with the remote-controlled meter 2 in order to allow the user to determine and depict a desired outcome, as will be discussed in greater detail later. In another embodiment, the processor 70 should be conventionally connected to the speaker 10, camera 12, lights 14, microphone 16, proximity sensor 18, gear motor 60, and transceiver 72 in order to assist the user in determining and depicting a desired outcome, as will be discussed in greater detail later. Finally, the processor 70 should be configured to allow the remote-control device 100 to interact with the processor 70. Also, as shown in FIG. 5, processor 700 can include a motor/processor cover 80.

With respect to transceiver 72, in one embodiment, transceiver 72 is a conventional transceiver that is capable of sending electronic signals to and receiving electronic signals from the remote-control device 100 through transceiver 72. Also, preferably, the transceiver 72 is configured to be able to receive the electronic signals from and send electronic signals to the processor 70 and interact with the gear motor 60 to cause the gear motor to move the pointer or needle 6 in a desired direction (left or right), as will be discussed in greater detail later.

As shown in FIG. 5, a motor/processor cover 80 has been removed. With the cover 80 removed, the speaker 10, camera 12, processor 70, transceiver 72, and AC plug adapter port 90 are now visible.

It is to be understood that in other embodiments, various features and/or additions can be added to the remote-controlled meter 2. For example, but not limited to, the following features or additions can be added to the remote-controlled meter 2:
1. The ability to interact with the child—through the use of camera 12, microphone 16, and/or speaker 10 mounted on the remote-controlled meter 2;
2. The ability to view the child as the child is looking at the meter 2—through the use of the camera 12;
3. The ability to communicate with the child as the child is looking at the meter 2—through the use of the microphone 16 and speaker 10;
4. The ability to remotely control the meter 2—through the use of the remote-control device 100 or any other suitable wireless or wired remote control device;
5. The ability to provide various lights and music on the meter 2—through the use of the speaker 10 and/or lights 14 mounted on the remote-controlled meter 2;
6. The ability to provide Wi-Fi capabilities on the meter 2—through the use of Wi-Fi, Bluetooth®, or other similar wireless protocols capable of being used with the remote-controlled meter 2 and remote-control device 100;
7. The ability to operate the meter 2 through a remote-control device 100 such as a laptop computer, a smart-phone, a tablet, or the like;
8. The ability to sense when the child is in proximity with the meter 2—through the use of a proximity sensor 18 mounted on the remote-controlled meter 2;
9. The use of an application platform (app) on the remote-control device 100, wherein the app is configured to allow the user to control the meter 2; and
10. The ability to provide a countdown date such as a birthday, anniversary, holiday, or other similar special occasion.

Operating the Remote-Controlled Meter

With respect to the operation of remote-controlled meter 2, attention is directed to FIGS. 1-5. As shown in FIGS. 1-5, remote-controlled meter 2 also includes remote control device 100. In one embodiment, as shown in FIGS. 1-3, remote-controlled meter 2 includes, in part, frame 4, pointer or needle 6, speaker 10, camera 12, lights 14, microphone 16, proximity sensor 18, removable front cover 20, and removable stand assembly 30.

As shown in FIGS. 4 and 5, in one embodiment, the remote-controlled meter 2 further includes, in part, hanging bracket 40, power source assembly 50, gear motor 60, processor 70, transceiver 72, motor/processor cover 80, and AC plug adapter port 90.

During the operation of remote-controlled meter 2, the operator can adjust the position of the pointer or needle 6 depending upon the outcome that the operator hopes to achieve. For example, assume that a child (not shown) approaches the remote-controlled meter 2.

In this instance, the child approaching may be detected visually by the operator, visually through a camera 12 located on the front of the remote-controlled meter 2, and/or a proximity sensor 18 located on the front of the remote-controlled meter 2.

Once the child gets within a desired distance from the front of the remote-controlled meter 2, the operator can manipulate the remote-control device 100 in order to cause the transceiver 72 to interact with processor 70 to activate the gear motor 28 in order to move the pointer or needle 6 in a desired direction. For example, assume the remote-controlled meter 2 is set-up so that the graphics 22 depict a naughty and a nice area. In this example, the operator may want to move the pointer or needle 6 towards the naughty area of graphics 22 or the nice area of graphics 22 depending upon the reaction that the operator would like to achieve from the child.

In another example, assume that the celebration is a Halloween party. In this case, the assume the remote-controlled meter 2 is set-up so that the graphics 22 depict a trick area and a treat area. In this example, the operator may want to move the pointer or needle 6 towards the trick area of graphics 22 or the treat area of graphics 22 depending upon the reaction that the operator would like to achieve from the child.

In still another example, assume that the celebration is a gender reveal party. In this case, the assume the remote-controlled meter 2 is set-up so that the graphics 22 depict a boy area and a girl area. In this example, the operator may want to move the pointer or needle 6 towards the boy area of graphics 22 or the girl area of graphics 22 depending upon the reaction that the operator would like to achieve from the expectant parents.

It is to be understood that in another embodiment, the remote-controlled meter 2 can be configured so that as the child approaches the remote-controlled meter 2 and the proximity sensor 18 detects the approaching child, the proximity sensor 18 interacts with the processor 70 such that the processor 70 interacts with the gear motor 60 to move the pointer or needle 6 to a randomly selected position.

Furthermore, as discussed above, in other embodiments, various features and/or additions can be added to the remote-controlled meter 2. For example, but not limited to, the following features or additions can be added to the remote-controlled meter 2:

1. The ability to interact with the child-through the use of camera 12, microphone 16, and/or speaker 10 mounted on the remote-controlled meter 2. In one embodiment, speaker 10, camera 12, and microphone 16 are electrically connected to processor 70 which is in turn electrically connected to the transceiver 72, wherein the transceiver 72 is capable of sending signal to an app on remote control device 100 through transceiver 72. This gives the user the ability to hear, speak with, and visually see the audience through the use of the remote-control device 100.
2. The ability to view the child as the child is looking at the remote-controlled meter 2 through the use of the camera 12. In one embodiment, the camera 12 is located on the front of the remote-controlled meter 2. The camera 12 interacts with the processor 70 such that the processer 70 is configured to send a signal through the transceiver 72 which allows the user of the remote-control device 100 to view the audience on the remote-control device 100. This gives the user the ability to see the reaction of the audience.
3. The ability to communicate with the child as the child is looking at the remote-controlled meter 2—through the use of the microphone 16 and speaker 10. In one embodiment, the speaker 10 and microphone 16 are located at the front of the remote-controlled meter 2. This gives the user the ability to hear from the audience and to communicate with the audience. The speaker 10 and microphone 16 interact with the processor 70 such that the processor 70 is configured to send a signal through the transceiver 72 which allows the user to communicate with and hear the audience. This gives the user the ability to interact with the audience based upon the audience's reactions.
4. The ability to remotely control the meter 2—through the use of the remote-control device 100 or any other suitable wireless or wired remote control device. The remote-control device 100 (which may or may not be configured with the app) is configured to interact with the transceiver 72 and the processor 70. Depending upon the signal received by the processor 70, the processor is configured to interact with the gear motor 60 to cause the gear motor 60 to move the needle 6 to desired location. This gives the user the ability to choose a desired outcome.
5. The ability to provide various lights and music on the meter—through the use of the speaker 10 and/or lights 14 mounted on the remote-controlled meter 2. In one embodiment, the lights 14 are powered by the power source assembly 50 and are located in the front of the meter 2. This gives the meter 2 accent lighting. Furthermore, audio sounds such as music or the like can be played through the speaker 10 located in the front of the meter 2. In another embodiment, the remote-control device 100 can be configured to send audio sounds such as music through the app to the transceiver 72 and the processor 70 so that the audio sound can be played through the speaker 10.
6. The ability to provide Wi-Fi capabilities on the meter 2—through the use of Wi-Fi, Bluetooth®, or other similar wireless protocols capable of being used with the remote-controlled meter 2 and remote-control device 100.
7. The ability to operate the meter 2 through remote-control device 100 such as a laptop computer, a smartphone, a tablet, or the like. All components should be configured to be able to interact with the transceiver 72 and processor 70. In this manner, the remote-control device 100 (which is configured with the app) allows the user to make the needle 6 move to a desired outcome, hear the audience, see the audience, play music, and/or speak to the audience.
8. The ability to sense when the child is in proximity with the meter 2—through the use of a proximity sensor 18 mounted on the remote-controlled meter 2. The proximity sensor 18 is located on the front of the meter 2. The proximity sensor 18 is configured to be able to send a signal to the processor 70. In turn, the processor 70 interacts with the transceiver 72 to send a signal to the remote-control device 100, thereby notifying the user that there is someone in proximity to the meter 2.
9. The use of an application platform (app) on the remote-control device 100, wherein the app is configured to allow the user to control the meter 2. The app is controlled by the remote-control device 100. The remote-control device 100 is configured to be able to send a signal to the transceiver 72 and the processor 70 thereby giving the user ways to communicate, hear, see, depict a desired outcome, and to tell when someone is in proximity to the meter 2.
10. The ability to provide a countdown date such as a birthday, anniversary, holiday, or other similar special occasion. The meter 2 can also be used to be a countdown meter in that the processor 70 can be configured to provide a countdown. This would be a specially designed meter 2 with specific graphics 22 that allow the user to move the needle 6 to specific dates/times shown on the graphics 22.

While it has not been mentioned, one familiar with the art would realize that the device is not limited by the materials used to create each apparatus that comprises the invention. Any other material type can comprise some or all of the elements in constructing and using the remote-controlled meter 2 in various embodiments of the present invention.

Although the present invention has been illustrated and described herein with reference to preferred embodiments and specific examples, it will be readily apparent to those of ordinary skill in the art that other embodiments and examples may perform similar functions and/or achieve like results. All such equivalent embodiments and examples are within the spirit and scope of the present invention, are contemplated thereby, and are intended to be covered by the following claims.

What is claimed is:

1. A remote-controlled meter for depicting a desire outcome, comprising:
   a frame having a first side and a second side;
   a front cover removably connected to the first side of the frame;
   a movable pointer located between the front cover and the first side of the frame;
   a plurality of graphics located along a portion of the front cover;
   a processor located on the second side of the frame;
   a power source assembly located on the second side of the frame, wherein the power source assembly is operatively connected to the processor;

a gear motor located on the second side of the frame, wherein the gear motor is operatively connected to the movable pointer, processor, and the power source assembly;

a transceiver located on the second side of the frame, wherein the transceiver is operatively connected to the processor and the power source assembly;

a remote-control device, wherein the transceiver is configured to interact with the remote-control meter;

a speaker located on the first side of the frame, wherein the speaker is operatively connected to the processor and the power source assembly;

a camera located on the first side of the frame, wherein the camera is operatively connected to the processor and the power source assembly;

a plurality of lights located on the first side of the frame, wherein the plurality of lights is operatively connected to the processor and the power source assembly;

a microphone located on the first side of the frame, wherein the microphone is operatively connected to the processor and the power source assembly; and a proximity sensor located on the first side of the frame, wherein the proximity sensor is operatively connected to the processor and the power source assembly.

2. The remote-controlled meter for depicting a desire outcome, according to claim 1, wherein the remote-controlled meter further comprises:

a removable stand assembly removably connected to the frame.

3. The remote-controlled meter for depicting a desire outcome, according to claim 1, wherein the power source assembly further comprises:

a battery pack.

4. The remote-controlled meter for depicting a desire outcome, according to claim 1, wherein the gear motor further comprises:

a low voltage, low revolutions per minute (rpm) motor.

5. The remote-controlled meter for depicting a desire outcome, according to claim 1, wherein the remote-controlled meter further comprises:

a motor/processor cover located over the processor and the gear motor.

6. The remote-controlled meter for depicting a desire outcome, according to claim 1, wherein the remote-controlled meter further comprises:

an AC plug adapter port.

7. A method of making a remote-controlled meter for depicting a desire outcome, comprising: providing a frame having a first side and a second side; providing a front cover, wherein the front cover is removably connected to the first side of the frame; providing a movable pointer, wherein the movable pointer is located between the front cover and the first side of the frame; providing a plurality of graphics along a portion of the front cover; attaching a processor on the second side of the frame; attaching a power source assembly on the second side of the frame, wherein the power source assembly is operatively connected to the processor; attaching a gear motor on the second side of the frame, wherein the gear motor is operatively connected to the movable pointer, processor, and the power source assembly; attaching a transceiver on the second side of the frame, wherein the transceiver is operatively connected to the processor and the power source assembly; providing a remote-control device, wherein the transceiver is configured to interact with the remote-control meter;

attaching a speaker on the first side of the frame, wherein the speaker is operatively connected to the processor and the power source assembly; attaching a camera on the first side of the frame, wherein the camera is operatively connected to the processor and the power source assembly; attaching a plurality of lights on the first side of the frame, wherein the plurality of lights is operatively connected to the processor and the power source assembly; attaching a microphone on the first side of the frame, wherein the microphone is operatively connected to the processor and the power source assembly; and attaching a proximity sensor on the first side of the frame, wherein the proximity sensor is operatively connected to the processor and the power source assembly.

8. The method, according to claim 7, wherein the method further comprises:

providing a removable stand assembly, wherein the removable stand assembly is removably connected to the frame.

9. The method, according to claim 7, wherein the power source assembly further comprises:

a battery pack.

10. The method, according to claim 7, wherein the gear motor further comprises:

a low voltage, low revolutions per minute (rpm) motor.

11. The method, according to claim 7, wherein the method further comprises:

providing a motor/processor cover, wherein the motor/processor cover is located over the processor and the gear motor.

12. The method, according to claim 7, wherein the method further comprises:

providing an AC plug adapter port.

13. A method of using a remote-controlled meter for depicting a desire outcome, comprising: providing a frame having a first side and a second side; providing a front cover, wherein the front cover is removably connected to the first side of the frame; providing a movable pointer, wherein the movable pointer is located between the front cover and the first side of the frame; providing a plurality of graphics along a portion of the front cover; attaching a processor on the second side of the frame; attaching a power source assembly on the second side of the frame, wherein the power source assembly is operatively connected to the processor; attaching a gear motor on the second side of the frame, wherein the gear motor is operatively connected to the movable pointer, processor, and the power source assembly; attaching a transceiver on the second side of the frame, wherein the transceiver is operatively connected to the processor and the power source assembly; providing a remote-control device, wherein the transceiver is configured to interact with the remote-control meter; operating the remote-control device to interact with the transceiver and the processor to cause the gear motor to move the movable pointer to a desired location on the plurality of graphics;

attaching a speaker on the first side of the frame, wherein the speaker is operatively connected to the processor and the power source assembly; attaching a camera on the first side of the frame, wherein the camera is operatively connected to the processor and the power source assembly; attaching a plurality of lights on the first side of the frame, wherein the plurality of lights is operatively connected to the processor and the power source assembly; attaching a microphone on the first side of the frame, wherein the microphone is operatively connected to the processor and the power source assembly; and attaching a proximity sensor on the first side of the frame, wherein the proximity sensor is operatively connected to the processor and the power source assembly.

14. The method, according to claim 13, wherein the method further comprises:
providing a removable stand assembly, wherein the removable stand assembly is removably connected to the frame.

15. The method, according to claim 13, wherein the power source assembly further comprises:
a battery pack.

16. The method, according to claim 13, wherein the gear motor further comprises:
a low voltage, low revolutions per minute (rpm) motor.

17. The method, according to claim 13, wherein the method further comprises:
providing a motor/processor cover, wherein the motor/processor cover is located over the processor and the gear motor.

* * * * *